(12) United States Patent
Jones et al.

(10) Patent No.: US 9,990,664 B2
(45) Date of Patent: Jun. 5, 2018

(54) METHODS AND SYSTEMS FOR MONITORING A FACILITY

(71) Applicant: Wal-Mart Stores, Inc., Bentonville, AR (US)

(72) Inventors: Nicholaus A. Jones, Fayetteville, AR (US); Robert J. Taylor, Rogers, AR (US); Aaron J. Vasgaard, Rogers, AR (US); Matthew A. Jones, Bentonville, AR (US); Todd D. Mattingly, Bentonville, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 0 days. days.

(21) Appl. No.: 15/586,486

(22) Filed: May 4, 2017

(65) Prior Publication Data

US 2017/0323365 A1  Nov. 9, 2017

Related U.S. Application Data

(60) Provisional application No. 62/332,887, filed on May 6, 2016.

(51) Int. Cl.
*G06Q 30/02* (2012.01)
*H04W 4/02* (2018.01)
(Continued)

(52) U.S. Cl.
CPC ... *G06Q 30/0625* (2013.01); *G06F 17/30129* (2013.01)

(58) Field of Classification Search
CPC .................................................. G06Q 30/02
See application file for complete search history.

(56) References Cited

U.S. PATENT DOCUMENTS

| 4,888,581 A | 12/1989 | Guscott |
| 5,287,266 A | 2/1994 | Malec |

(Continued)

FOREIGN PATENT DOCUMENTS

| EP | 0753175 | 8/2002 |
| EP | 2204783 | 7/2010 |

OTHER PUBLICATIONS

GPS Tracking, Supermarket Uses GPS tracking devices on shopping carts, LiveViewGPS, dated May 26, 2015. (Year: 2015).*

(Continued)

*Primary Examiner* — Mark A Fadok
(74) *Attorney, Agent, or Firm* — Fitch, Even, Tabin & Flannery LLP

(57) ABSTRACT

In some embodiments, apparatuses and methods are provided herein useful for monitoring a facility, such as the safety, security, and status of individuals and items within the facility. In one illustrative approach, a retail facility maintains information regarding product location, in part, from correlating a shopper's cart path and their purchased items with those of other shoppers. In some approaches, a cart path may be determined, in part, by depositing compounds on a floor surface, provide shopping carts configured to pick up the compounds deposited on the floor of the retail facility, and capture, via a compound detector, the compounds deposited on the cart wheels of a particular shopping cart during a customer checkout at a point of sale terminal, and generate an estimated cart path for the particular one of the plurality of shopping carts.

23 Claims, 5 Drawing Sheets

(51) Int. Cl.
  *G06Q 30/06* (2012.01)
  *G06F 17/30* (2006.01)

(56) References Cited

U.S. PATENT DOCUMENTS

| | | | |
|---|---|---|---|
| 5,563,329 A | | 10/1996 | Smith |
| 5,961,072 A | | 10/1999 | Bodle |
| 5,995,015 A | * | 11/1999 | DeTemple .......... G06K 17/0022 340/5.9 |
| 6,515,586 B1 | | 2/2003 | Wymore |
| 7,959,835 B2 | | 6/2011 | Cranor |
| 8,325,982 B1 | | 12/2012 | Moon |
| 2001/0028301 A1 | * | 10/2001 | Geiger .................. B62B 3/1408 340/5.91 |
| 2004/0229560 A1 | | 11/2004 | Maloney |
| 2005/0136944 A1 | * | 6/2005 | Misikangas .......... G01S 5/0252 455/456.1 |
| 2006/0200378 A1 | * | 9/2006 | Sorensen ............. G06Q 10/063 705/7.29 |
| 2008/0230603 A1 | | 9/2008 | Stawar |
| 2009/0326807 A1 | * | 12/2009 | Ramaswamy .......... H04L 67/12 701/408 |
| 2011/0029342 A1 | * | 2/2011 | Wolinsky ............... G06Q 30/02 705/7.29 |
| 2011/0029997 A1 | * | 2/2011 | Wolinsky ............... G06Q 30/02 725/12 |
| 2012/0193408 A1 | * | 8/2012 | Shastri ................. G06Q 10/00 235/375 |
| 2014/0150708 A1 | | 6/2014 | Riekie |
| 2017/0308911 A1 | * | 10/2017 | Barham ................. H04W 4/02 |

OTHER PUBLICATIONS

Sippola, Mark R., et al.; "Measurements and Modelling of Deposited Particle Transport by Foot Traffic Indoors"; Environment Science & Technology; pubs.acs.org/doi/pdfplus/10.1021/es404886x; published Feb. 28, 2014; pp. 3800-3807.

Tian Y., Sul K., Qian J., Mondal S., & Ferro AR; "A Comparative Study of Walking-Induced Dust Resuspension Using a Consistent Test Mechanism;" PubMed; https://www.ncbi.nlm.nih.gov/pubmed/24605758; Dec. 24, 2014; pp. 1-3.

PCT App. No. PCT/US2017/031209; International Search Report and Written Opinion dated Aug. 7, 2017; pp. 1-56.

* cited by examiner

METHODS AND SYSTEMS FOR MONITORING A FACILITY

CROSS-REFERENCE TO RELATED APPLICATION

This application claims the benefit of U.S. Provisional Application No. 62/332,887, filed May 6, 2016, which is incorporated herein by reference in its entirety.

TECHNICAL FIELD

This invention relates generally to monitoring individuals, vehicles, and/or carts in a facility, such as a retail facility with retail items.

BACKGROUND

As individuals move through facilities, such as, for example, shopping malls, transit facilities (e.g., train stations, airports, subway platforms, etc.), military installations, and nuclear facilities, among others, there are safety and security concerns that can be difficult to manage, especially at large, public facilities. Many facilities have cameras, such as overhead cameras, that are used to monitor individuals and crowds. These cameras oftentimes do not get clear images of each of the individuals, especially in a crowded space, thereby making it difficult for anyone viewing the images to determine where the individual has visited in the facility and/or what the individual has been doing in the facility. Those tasked with maintaining the public's safety and security would benefit from a supplemental or improved system for monitoring individuals in large facilities.

The public also appreciates certain conveniences at many of those public facilities such as, for example, shopping malls or individual retail stores. As a convenience to shoppers, many retail facilities offer shopping carts that customers can use while they are shopping within the facility. These shopping carts generally have a basket portion, a handle, and wheels such that the shopping carts can easily be moved around a retail shopping facility as users fill the shopping cart with various items they intend to purchase. Further, modern retail environments often look for ways to further improve the customer experience, such as by providing convenient, ready access to retail products or items. To that end, a retail facility may find it advantageous to make locating products of interest easier for customers.

BRIEF DESCRIPTION OF THE DRAWINGS

Disclosed herein are embodiments of systems, apparatuses and methods pertaining to maintaining a database of item locations, in part, from cart path information obtained from cameras in shopping carts. This description includes drawings, wherein.

Figure 1:
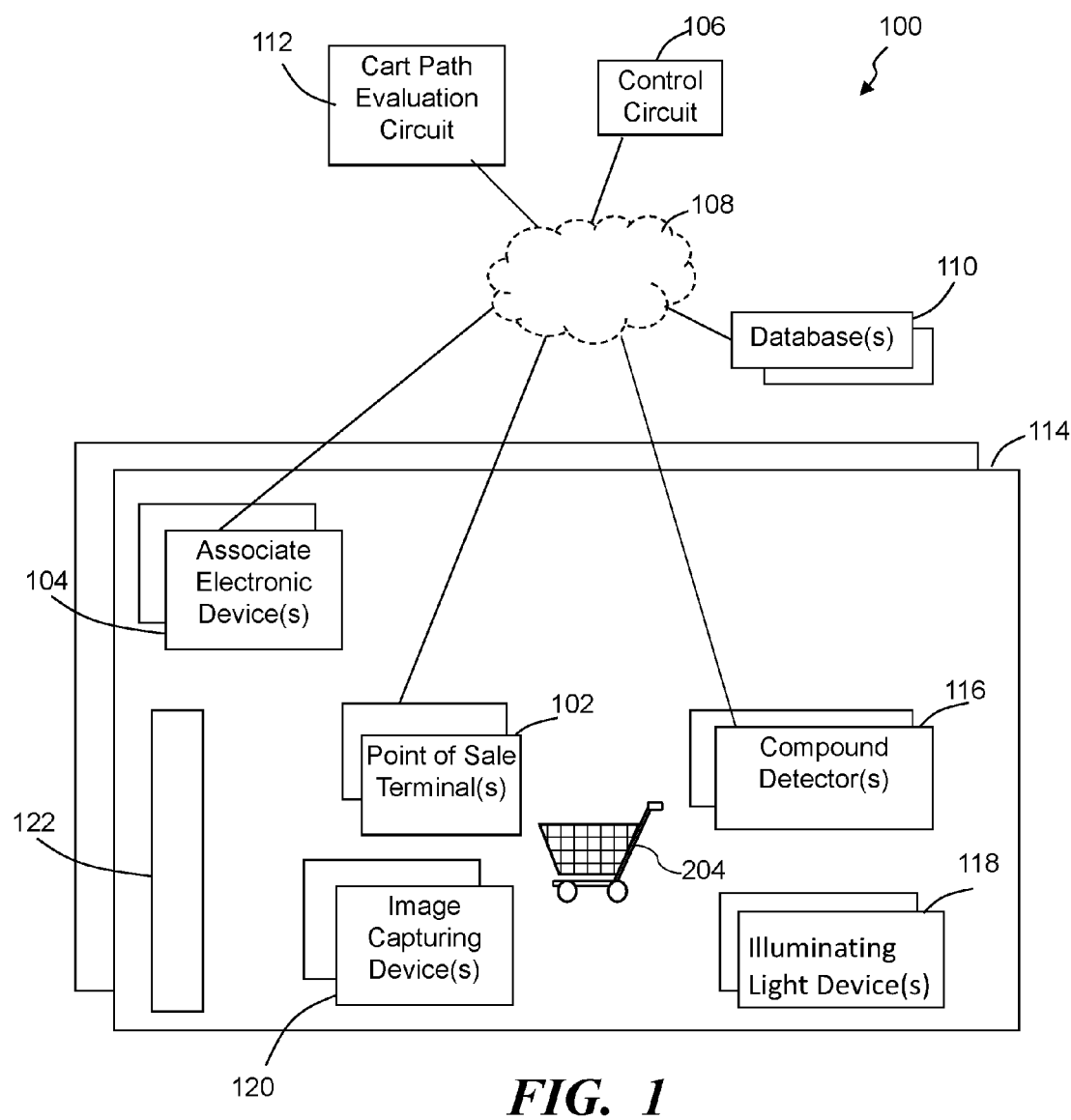
FIG. 1 is a simplified block diagram of an exemplary item location system in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful to determine where a customer visited within a retail facility, a customer's pathway through a retail facility, and/or the aisle location of various retail items within the retail facility. Accordingly, the system, apparatuses and methods permit maintenance of a database of item locations, in part, from cart path information obtained by analyzing the different compounds picked up by the cart wheels from the floor of retail facility and a list of purchased items obtained from point of sale terminals or registers. By one approach, such an item location system includes a database of retail items within a retail facility and an aisle location associated with some of the retail items, the retail facility having shopping aisles with aisle floors having different compounds deposited thereon (such as, for example, a first compound in one aisle having a first light spectra and a second compound in another aisle having a second light spectra), a plurality of shopping carts with cart wheels that pick up the compounds deposited on the floor surfaces, a compound detector and a point of sale terminal in the retail facility or location, and a control circuit. In one embodiment, the control circuit is configured to generate an estimated cart path for a particular one of the shopping carts by analyzing the detected compounds present on the cart wheels of the particular shopping cart. Further, in one example, the control circuit may also associate the cart path with the purchased items identified at the point of sale terminal and compare the associated cart path and list of purchased items from one shopping cart with similar information from other customers. For example, the control circuit can compare associated cart paths and purchased items of a plurality of customers. In one illustrative approach, the control circuit may further identify a particular aisle location of one of the plurality of retail items based on overlap between the associated cart path and list of purchased items and other customer cart paths and purchased items and update the database to include the particular aisle location identified for one of the retail items. Further, in one example, the control circuit may update the database to include the particular aisle location identified when comparing the associated cart paths and purchased items.

As used herein, an aisle location is generally one or more physical locations within a retail facility or location where a particular retail item can be found. In some embodiments, the database includes a plurality of aisle locations for some retail items. For example, the batteries may be located near the electronics department, in a section of the toy aisle, and near home appliances, among other locations. In this example, batteries may have three aisle locations stored in the database of aisle locations and retail products. By one approach, a database may include a primary aisle location and additional or supplemental aisle location(s). Further, if the system or method described herein identifies an aisle location for a retail product in the database for which no other aisle location information has been provided, the identified aisle location may be used as a primary aisle location. Alternatively, if other aisle locations are saved within the database, an identified aisle location may be added to the database as an additional location, if one or more other aisle locations are stored in the database.

As noted above, the chemical compounds are applied to floor surfaces of the retail facility. By one approach, different areas of the retail facility will have different compounds applied to the floor therein and as a shopping cart is advanced through one the different areas of the retail facility, the floor compounds disposed on the floor in that area will be picked up or adhered to the wheel(s) of the shopping cart that contact the floor compound. In one example, the various chemical compounds applied to the floor surfaces are configured to emit or absorb specific light wave or a combination of specific light waves. In one approach, at least a plurality of shopping aisles within the retail facility have distinct floor compounds disposed on the floors within the aisles such that the compound detector can analyze the cart wheels to identify which shopping aisles the shopping cart has traveled through. As used herein, the shopping aisles may include the passageway between shelves, end caps, displays, walls, and other facility structures. In addition to the shopping aisles, the retail facility also may use floor compounds within other hallways and corridors within the retail facility.

In one approach, the shopping aisles within the retail facility may have at least one floor compound applied to the floor therein that identifies the aisle when the compound detector analyzes the compound on the cart wheels. In another approach, hallways or corridors within the retail facility also may have a floor compound disposed therein. The floor compound, which is accumulated by the cart wheels as the shopping cart is advanced there through, is identified by the compound detector.

Further, in one illustrative embodiment, the floor compounds are configured to be picked up or accumulated by the cart wheels as the shopping carts are moved or advanced through the retail facility. In one example, the cart wheels have an affinity for the compounds deposited on the floor surfaces.

To analyze the compounds disposed on the cart wheels, the retail facility may have one or more compound detectors, which may be disposed proximate the point of sale terminal(s) or throughout the retail facility. In one illustrative approach, the compound detector may be a spectrometer. In one example, the compound detector is configured to measure an amount of each of the plurality of compounds present on the cart wheels. In this manner, the compound detector can estimate the amount of area traveled through which had a particular floor compound. For example, if compound A is found in aisle 1 and compound B is found in aisle 2 and compound C is found in aisle 3 and a cart has a thin layer of compound A, no compound B, and a thick layer of compound C, a central computer may determine that the shopping cart travelled a short distance through or over aisle 1 and spent a significant amount of time shopping or traveling through aisle 3, but did not travel through aisle 2. In one approach, once the compound detector detects the floor compounds disposed on the cart wheels, the compound detector may communicate or transfer the information to the central computer.

In another example, an illuminating light may be disposed proximate the compound detector and configured to shine a specific light frequency at the cart wheels to assist the compound detector in detecting the compounds present thereon. In another embodiment, an image capturing device proximate the point of sale terminal may be configured to take or record an image or video of the cart wheels to assist with the evaluation of the floor compounds disposed on the cart wheels. In one configuration, these cart wheel images and other information about the floor compounds disposed on the may be communicated or transferred to the control circuit or central computer.

In one embodiment, the system also may include an associate electronic device that is in communication with the control circuit and database and may display the aisle location(s) of retail items when queried. Further, the associate electronic device may receive information from an associate and update the database of aisle locations accordingly. For example, the associate electronic device may be employed to add a retail item into the database, add an aisle location of one of the plurality of retail items in the database, and update at least one of the retail items or aisle locations associated therewith.

In addition to aisle locations, the cart path information and list of purchased items can be analyzed to determine from where a particular purchased item was retrieved. By analyzing the associated cart path and list of purchased items, the control circuit may identify a likely retrieval location for a purchased item. As used herein, a purchased item will have only one retrieval location from which that particular purchased item was retrieved, but a retail item may have a plurality of aisle locations where such retail items are located within the retail facility. For example, while AA batteries may be found in aisles 2, 27, 29, and 30 of a retail facility, the particular AA batteries in a shopper's cart will have come from only one of those locations.

In one approach, the system may determine a low shelf supply based upon the receipt of a number of identical retrieval locations. Further, by one approach, a store associate may be sent a notification regarding the low shelf supply, such as through the associate electronic device.

In operation, the control circuit may estimate a continuous cart path based on the floor compounds accumulated by the cart wheels, the order of accumulation, and the amount of the accumulation.

In one illustrative embodiment, when the shopping cart is brought to the point of sale terminal for checkout, the cart wheels are analyzed to determine what floor compounds are present thereon and what aisles or areas of the retail facility were visited based on the floor compounds, which identify the area of the retail facility visited. The information about the floor compounds (and possibly images of the cart wheels themselves) may be transferred or communicated to the control circuit, point of sale terminal, and/or another device in communication therewith.

In one illustrative approach, the system further includes a compound cleaning area that removes the floor compounds disposed upon the cart wheels (and possibly other items such as the soles of shoes) that have accumulated floor compounds. By one approach, the compound cleaning area is disposed in between the point of sale terminal and an exit of the retail facility. In another approach, the compound cleaning area is disposed proximate the exit or shortly beyond the exit. In this manner, after transferring or communicating the information regarding the floor compounds to the control circuit, the cart wheels may be cleared such that the shopping cart may be used by another shopper who may travel to different areas of the retail facility and accumulate different floor compounds on the cart wheels.

In another illustrative embodiment, a retail location or facility is able to maintain information regarding product location, in part, with information gathered from correlating a shopper's cart path and their purchased items with those of other shoppers according to a method described herein. By one approach, the method includes, for example, maintaining a database of aisle locations associated with retail items, depositing a plurality of compounds on a floor surface of the retail facility, the plurality of compounds including a first compound having a first light spectra in a first area and a second compound having a second light spectra in a second area (the first and second light spectra absorbing or emitting different spectra of light), providing shopping carts with wheels configured to pick up the compounds deposited on the floor of the retail facility, and capturing, via a compound detector, the compounds accumulated or deposited on the cart wheels of a shopping cart during a customer checkout at a point of sale terminal. Further, the method may include generating an estimated cart path for one of the shopping carts based on the information obtained by the compound detector.

In another illustrative embodiment, the method may include receiving a list of purchased items from the point of sale terminal and associating the purchased items with the estimated cart path, identifying a particular aisle location of one of the purchased retail items by comparing the associated list of purchased retail items and cart path with other customer cart paths and purchased items associated therewith, and updating the database accordingly.

By one approach, updating the database includes adding a particular aisle location as an additional aisle location or a primary aisle location if no other aisle location information is stored within the database.

In one embodiment, when a customer is interested in where a particular retail item is shelved, a store associate may query the database, which may notify the associate of one or more aisle locations of the item of interest.

In addition to aisle locations, the method also may include extracting a retrieval location of at least one of the purchased items by analyzing the cart pathway (based on the detected floor compounds) and the associated purchased retail item(s). In this manner, a low shelf supply may be determined based on the extraction of identical retrieval locations a predetermined number of times within a certain amount of time. This information may be provided to a store associate who can restock the display shelves.

In addition to providing information about the stock levels of retail products, a retail location may be of interest when analyzing consumer behaviors within the retail facility. Thus, the retail location may be interested not only in the aisles visited by the shopping cart, but also time spent at various aisle locations (as may be determined by the amount of a particular floor compound on the cart wheels).

By having an updated database of aisle locations associated with the retail items, a store associate can direct consumers to the locations of particular retail items upon request. Further, by knowing where the purchased items are being retrieved from, the store associates are able to replenish the shelves from which the items were retrieved. Further, if a retail item is not frequently retrieved from a particular aisle location (such that it does not show up in many different cart pathways), then a store associate may remove that retail item from that shelf location such that the shelf space may be repurposed to display different retail items.

In yet another configuration, an aisle location associated with a retail item may be removed from the database if it is only highly infrequently found in cart pathways correlating to the purchased retail items. For example, retail items can be incorrectly shelved or a customer may decide they no longer wish to purchase an item and may merely remove the item from their cart and place it on a nearby shelf without regard for where the item properly belongs. Thus, when comparing other customer pathways and purchased items, the control circuit may be able to determine or highlight outliers and remove them from the database. In one illustrative approach, the control circuit may flag an aisle location for further consideration by an associate or may remove it from the database of aisle locations. In one illustrative embodiment, the control circuit may include a tentative aisle location in the database, but may flag this as suspect or may give it a low degree of certainty.

As used herein, the shopping carts may include baskets with wheels, flatbed carts, bins, and handheld baskets, among others that are moved around a retail facility or location. Further, the retail facility may be any type of shopping facility or location in which products are displayed, for sale, and/or distributed at numerous points around the facility such that the customer travels through the space to retrieve desired products. Further, the facility may be any of a number of sizes or formats and may include products from one or more merchants. For example, a facility may be a single store operated by one merchant or may be a collection of stores covering multiple merchants such as a mall.

The teachings herein also contemplate monitoring or analyzing compounds that have been applied onto the floors of other facilities by analyzing the individuals or objects that have contacted the compound, such as, for example, by monitoring portions of individuals, vehicles, and/or carts that contact the ground or floor. As suggested above, the different compounds may be applied to different sections or spaces of a facility and when someone or something contacts the floor or ground with those applied compounds thereon, the compound is picked up by the person or object. Accordingly, when the person or object is analyzed at an access point in or adjacent to the facility, the compound detector (and any associated control circuit) can determine where the person or object was within the facility by identifying the compounds found on the individual or object and using that information to identify the associated area or location within the facility where that compound is disposed or applied to the floor or ground.

For example, these teachings may be used to help monitor a secure facility that requires special clearance or monitored access by the occupants or visitors. By one approach, such a system requires identity confirmation, such as via a badge or fingerprint scan, at an access point before permitting individuals to enter or exit from sections of the facility or the facility itself. At these access points, the system may include a compound detector that scans portions of the individual or object that contact the floor including the footwear (e.g., shoes or boots) or wheels, to determine where the individual or object has visited within the retail facility. This information may then be correlated with the access or clearance level that the individual's identity or badge grants them. If compounds detected indicate that the individual visited a location or area that their clearance or access level would not have permitted, the individual may be flagged or prevented from leaving the facility before being contacted by the facility's security department. In such a configuration, the system may include a database of individuals and their associated clearance or access permissions, which may be compared with the compounds detected on that individual to identify those people who may have accessed secure areas to which they did not have permission. The compound detectors at such facilities also may scan for dangerous compounds, such as explosive compounds.

In another similar paradigm, the system may have particular detectable compounds disposed in particular secure areas (such as, for example, a compound emitting a first light spectra in a first secure area of an airport). In this manner, as individuals, vehicles, carts, or other objects are moving through an access point at the airport, a compound detector may scan for the particular compound having the first light spectra to see if someone passing through the access point has the particular compound on their shoes, luggage wheels, or cart tires. If the particular compound is found on an individual, the system typically flags that individual for further monitoring or for contact or follow-up with security personnel. In some configurations, this manner of identifying a potential security breach may be less conspicuous than other manners of identifying security breaches.

FIG. 1 illustrates a simplified block diagram of an exemplary shopping or item location system 100, according to some embodiments, which facilitates maintaining a database of item locations, in part, from cart path information obtained by analyzing the different compounds picked up by or accumulated on the cart wheels from the floor of a retail facility and lists of purchased items obtained from point of sale terminals or registers within the retail facility. The item location system 100 includes a database 110 of a plurality of retail items disposed within a retail facility and an aisle location associated with some of the retail items. The database 110 may be queried by an associate electronic device 104 for information on an aisle location for a particular retail product. In addition, the information in database 110 may be compared with information from the point of sale terminal(s) 102 and the cart pathway information provided to the control circuit or central computer 106 and possibly a cart path evaluation circuit 112 either directly or indirectly, such as through a network 108. In some configurations, the network 108 also may provide information from the database 110 and central computer 106 to a headquarters location 401 (FIG. 4) that maintains information on product location information for several retail facilities and a planogram that provides an intended or master floor plan and/or product locations.

The shopping or item location system 100 also may include one or more compound detectors 116 (disposed within a retail facility 114) that may be disposed proximate one or more point of sale terminals 102 or may be disposed throughout the retail facility 114. In one illustrative embodiment, the compound detector 116 is a spectrometer. By one approach, compound detectors 116 are disposed proximate the point of sale terminals 102 and include an optical sensor that can identify the various floor compounds on the cart wheels. By another approach, the compound detectors 116 are cameras that can detect or track movement of the compounds through the retail facility by dividing the retail facility into areas with different compound detectors 116 responsible for monitoring compounds and movement through that area.

The compound detectors 116 may have or may be associated with an illuminating light device 118 that may shine a light at a specific light frequency or otherwise expose the cart wheels to a specific light frequency, in addition to the reflected ambient light within a retail facility. The illuminating light device 118 is used with the compound detector 116 or optical sensor to identify the floor compounds disposed on or accumulated by the cart wheels. For example, as the cart 204 is adjacent the point of sale terminal 102 an illuminating light device 118 can provide an excitation source, such as an ultraviolet light, that permits the compound detectors 116 to identify the presence of the floor compounds sensitive to the ultraviolet light.

In addition, the retail facility 114 may include one or more image capturing devices 120 disposed proximate the point of sale terminals 102 that may capture images of the cart wheels as they are being analyzed for the presence of the floor compounds, such as when the shopping cart is disposed proximate the point of sale terminal 102 as the customer is checking out or paying for their items. For example, if the cart wheels are exposed to an illuminating light device 118, such as an ultraviolet light, the image capturing device 120 may record or capture an image of the cart wheels as the illuminating light device 118 is shining on the cart wheels.

FIG. 1 illustrates one or more associate electronic devices 104, one or more point of sale terminals 102, one or more compound detectors 116, one or more illuminating light devices 118, one or more image capturing devices 120 within the retail facility 114. The cart path evaluation circuit 112, control circuit 106, database(s) 110, and network 108, or portions thereof also may be disposed within the retail facility 114.

As illustrated in FIG. 1, the point of sale terminal(s) 102, the associate electronic device(s) 104, the central computer or control circuit 106, the database(s) 110, and the cart path evaluation circuit 112, if present, may be communicatively coupled, either directly or indirectly, such as over one or more distributed communication networks 108, which may include, for example, LAN, WAN Internet, cellular, Wi-Fi, and other such communication networks or combinations of two or more of such networks.

By one approach, a retail location may have shelves 202 (see FIG. 2) with floor compounds disposed on the aisle floor surfaces. As used herein, aisles and their floor surfaces may include both the passageway between shelves and the passageway between shelves and other structures.

Figure 2:
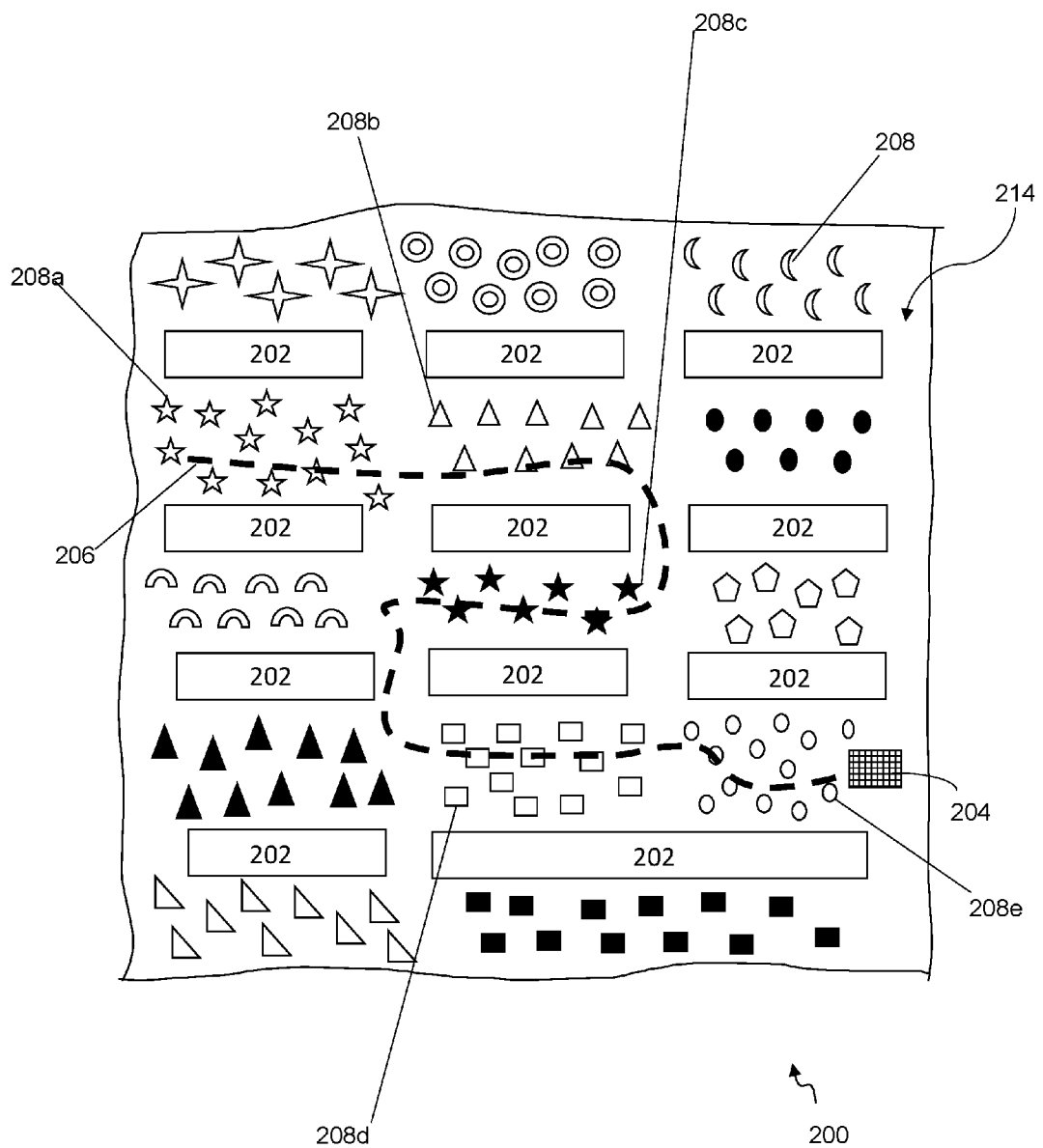
FIG. 2 is a schematic illustration of a shopping space in accordance with several embodiments.

By one approach, the floor compounds have different properties such that one compound absorbs or emits light with a specific light frequency and another compound absorbs or emits light with a different specific light frequency. In one illustrative embodiment, the floor surfaces of the aisles have different compounds disposed therein. In another embodiment, other floor surfaces such as hallways, corridors, or feature or promotion areas within the retail facility will have different floor compounds disposed thereon. While the example of FIG. 2 illustrates different compounds in different aisles, in another example, different compounds may be found in different zones or departments within the retail facility. For example, an orange compound may be disposed in the sporting good section and a green compound may be disposed in the food sections.

In one example, the floor compounds are applied to the floor by hand, tool, or machine such as, for example, by scrubbing, painting, and rolling, among others. These floor compounds may be oil-based, wax-based, and flecks- or flake-based, among others. As noted above, the different compounds or chemicals have different absorption or emission characteristics such that the compounds absorb or emit different light wave spectra or combination of light waves. As compounds with specific absorbing and emitting patterns (both within and without the visible spectra) are known, they require no further elaboration herein.

FIG. 2 illustrates how the aisle floor 214 of the retail facility 200 in between shelves and other facility structures has different floor compounds 208 having different light spectra attributes disposed thereon. As the cart 204 is advanced through the retail facility, the wheels contact the aisle floor and pick up or accumulate the floor compounds disposed thereon. As shown in FIG. 2, the shopping cart 204 traveled cart path 206 and accumulated floor compounds 208a, then compound 208b, then compound 208c, then compound 208d, and finally compound 208e. The compound detectors 116 may detect the floor compounds 208 on the cart wheels and also may obtain the order of the compounds 208 to determine the progression or continuous pathway of the cart. In one illustrative approach, the compound detectors 116 also may determine an amount of the floor compound on the cart wheels to determine the amount of time a shopping cart 204 spent at a particular location or an amount of area traveled over or through.

By one approach, the floor compounds are configured to be picked up or accumulated by the cart wheels as the shopping carts or moved or advanced through the retail facility. In this manner, the compounds are not permanently applied, shellacked, or adhered to the floor surface. In this manner, the floor compounds may be transferred to the surface of the cart wheel by merely having the cart wheel roll over the floor surface. In one example, the cart wheels have an affinity for the compounds deposited onto the floor surfaces. For example, the material forming the tire or outer surface of the cart wheel may be formed of or may include a compound or chemical, such as, for example, polymers, that facilitates the floor compound being picked up by the cart wheel. By one approach, the material forming the cart wheel and the floor compounds are chosen such that the floor compounds are picked up by the cart wheels and not typically by shoes or other items such as strollers or wheel chairs. In yet another approach, the floor compounds are chosen such that they are easily and quickly removed from cart wheels, shoe soles, and other wheels such as those found on strollers, wheel chairs, and other mobile structures.

After the shopping cart 204 has advanced through a portion of a retail facility 200 via cart path 206, the central computer 106 may determine the path taken by the shopping cart 204 by analyzing the floor compounds 208 detected by the compound detector 116. Further, as discussed below, the identity of the floor compounds and possibly images of the cart wheels at a point of sale terminal 102 or register may be communicated or transferred to the central computer 106 at the point of sale terminal 102, such as when the shopper is paying for the retail items selected while shopping in the retail facility.

In one exemplary embodiment, a shopper has their purchases scanned and pays for their purchases at a point of sale terminal 102 within the retail facility. At the point of sale terminal 102, possibly during the transactions between the retail facility and the shopper, the floor compounds may be detected and, possibly, images of the cart wheels with the floor compounds thereon may be taken, which may then be communicated or transferred to a device that may provide the floor compounds identified and/or cart wheel images to the central computer 106, either directly or indirectly, such as through a network 108. Furthermore, the point of sale terminal 102 provides an account of the purchased items, such as a list, record, catalog, or index of purchased items to the central computer 106.

To evaluate the information obtained from the shopping cart (including the floor compounds disposed on the cart wheels) and the retail items purchased at the point of sale terminal 102, the point of sale terminal 102, central computer 106, or the cart path evaluation circuit 112 (which may be provided the captured images of the cart wheels, information about the floor compounds detected, and/or the list of purchased items) or similar device may be configured to associate the purchased items with the floor compounds detected and the cart path derived therefrom. Further, the central computer 106 and/or the cart path evaluation circuit 112 may detect a cart path of a particular shopping cart based on the detected floor compounds for the particular shopping cart. Then, this cart path (possibly along with the images of the cart wheels themselves) and the purchased items, may be correlated or associated with one another.

By one approach, the central computer 106 and/or the cart path evaluation circuit 112 subsequently compare the cart path determined by detecting the floor compounds on the cart wheels and associated retail items with similar information (cart paths and associated retail items) from other customers. In this manner, the central computer 106 and/or the cart path evaluation circuit 112 may identify a particular location of one of the retail items based upon overlap between the associated cart path and purchased retail items with similar information from other customers and possibly the information in the database of retail items or another database such as a database of cart paths and associated retail items.

By one approach, a database of cart paths and associated retail items is maintained and each additional data point (cart path and associated retail items) is evaluated in comparison with the database of cart paths and associated retail items. For example, if a customer buys AA batteries, toilet paper, and a birthday card and the customer's cart wheels obtained floor compounds from aisles 2, 12, and 33, this information can be compared with other customer's information and/or with a database of cart paths and associated retail items. If this particular customer is compared with another customer who purchased large athletic socks, potato chips, printer ink, and AA batteries and this customer's cart wheel obtained floor compounds from aisles 2, 15, 16, and 17, both of these customers appear to have obtained batteries from aisle 2. If the database of retail items does not previous indicate that AA batteries are located in aisle 2, the database will be updated to indicate such information. By one approach, if the database of retail items does not include an aisle location, the database may be updated to indicate that this location is a primary or additional aisle location if other aisle locations are stored within the database. The database also may be updated to note the recent purchase activity as discussed below.

Depending on the number of purchased items and aisle markers, the central computer 106 and/or the cart path evaluation circuit 112 may be able to determine a likely aisle location, but may not be able to definitively confirm such an aisle location. In this circumstance, the database may be updated to indicate a likely aisle location for a particular retail item. In one illustrative approach, a level of confidence may be assigned to a likely aisle location.

In the previous example, in addition to determining or confirming that aisle 2 has shelf space devoted to AA batteries, the aisle 2 location is the retrieval location of those purchased AA batteries or the location from which the particular AA batteries purchased by these two customers was taken. As mentioned above, a purchased retail item typically has only one retrieval location, but a retail item may have a plurality of aisle locations where those retail items are located or shelved within the retail facility. Thus, while AA batteries may be found in aisles 2, 27, 29, and 30, the AA batteries found in the two example carts discussed and compared were both obtained from aisle 2. Thus, these AA batteries have a retrieval location of aisle 2. In one illustrative approach, a store associate may use this information to know when a shelf location is running low on a particular retail item and may require restocking. In short, in addition to determining an aisle location of retail items, the central computer 106 and/or the cart path evaluation circuit 112 may also determine a retrieval location of purchased items. This information may then be communicated to a store associate, such as, for example, via an associate electronic device 104 in communication with the network 108.

In one illustrative approach, the detected floor compounds and possibly cart wheel images are communicated to or transferred to the point of sale terminal or another device proximate the point of sale terminal when the customer is paying for the retail items collected throughout the retail facility. By one approach, once the floor compounds are detected and/or images of the cart wheels taken, the cart wheels may be cleaned of the floor compounds. Thus, in one illustrative approach, the retail facility 114 may further include a floor compound clearing or cleaning area 122 that removes substantially all of the floor compounds disposed on the cart wheels. By one approach, the cleaning area also may remove the floor compounds from other surfaces such as the soles of shoes or stroller wheels. By one approach the compound cleaning area 122 is disposed in between the point of sale terminal and an exit of the retail location.

Figure 3:
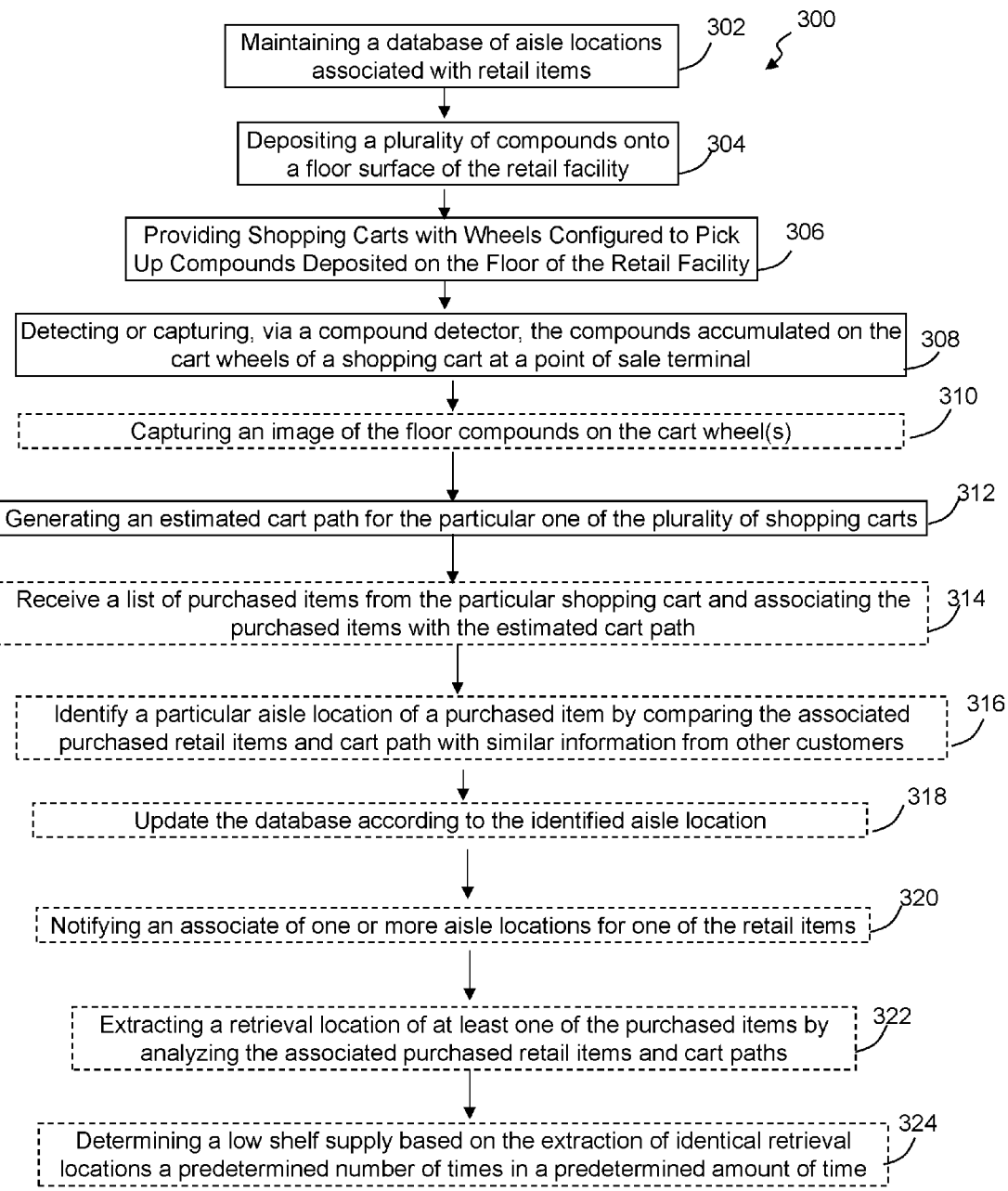
FIG. 3 is a flow diagram of a method in accordance with several embodiments.

Referring now to FIG. 3, a process 300 for locating and monitoring items within a retail facility according to some embodiments discussed herein is illustrated. The method 300 includes, for example, maintaining 302 a database of aisle locations associated with retail items and depositing 304 a plurality of floor compounds onto a floor surface of a retail facility. In one configuration, the different aisle floors or zones within a retail facility will have different floor compounds such that a compound detector can determine which aisles a shopping cart has visited based on the floor compounds accumulated onto the wheels of the shopping cart. For example, a first particular floor compound with its particular or distinct light spectra is disposed within a particular aisle and a second particular floor compound with its particular or distinct light spectra is disposed within another particular aisle. Further, each of the particular floor compounds and the particular aisle in which the particular floor compound is disposed are associated with one another in a compound information database 418.

In step 306, the process 300 includes providing shopping carts with wheels configured to pick up compounds deposited on the floor of the retail facility. As noted above, this may include embedding a material in the cart wheels that facilitates the floor compound adhering or being picked up by the cart wheels.

The process 300 also includes capturing or detecting 308 the floor compounds accumulated on the cart wheels of a shopping cart. By one approach, the detection 308 occurs at the point of sale terminal, such as, for example, when a customer is checking out or paying for their items. By yet another approach, the detection 308 may occur throughout the retail facility by having compound detectors throughout the retail facility and configured to track or monitor carts within a certain area proximate the compound detector.

In step 310, the process 300 may include capturing 310 an image of the floor compound on one or more of the cart wheels. For example, the image captured 310 may assist with identifying the floor compounds that have been attracted to or accumulated on the cart wheels.

In one illustrative embodiment, the identity of the floor compounds detected and images captured of the cart wheel (if any) may be communicated to or transferred to the central computer, control circuit, and or a cart path evaluation circuit to assist with generating 312 a cart path for the shopping cart. By one approach, generating the cart path may include analyzing the floor compounds found on the cart wheels, the order of the floor compounds located on or affixed to the cart wheels, and the amount of the floor compounds on the cart wheels. In this manner, generating a cart path 312 may include estimating a continuous cart path based upon the identified floor compounds, the order of the floor compounds on the cart wheels, and the amount of the floor compounds. This may be of particular interest when creating or modifying a store layout or planogram. For example, if a particular display is attracting a significant amount of interest, the store may decide to place this display in an area that will drive traffic through other aisles of potential interest.

In step 314, the process may include receiving an account of a customer's purchased retail items at the point of sale terminal and then associating with the cart pathway obtained from the floor compounds. Alternatively, in one embodiment, the purchased items are associated with the floor compounds in addition to or instead of the cart pathways.

In step 316, the process 300 identifies a particular aisle location of a purchased retail item by comparing the associated list of purchased retail items and pathway generated or the floor compounds identified with similar information from other customers, such as purchased retail items and associated pathways or identified floor compounds. As discussed above, by one approach, this comparison may be made by comparing a customer data point with a database of other customer paths and purchased items.

Further, after identifying 316 an aisle location, the process 300 may update 318 the database of aisle locations according to the particular aisle location identified by comparing the purchased retail items and associated pathways or floor compounds with similar information from other customers. By updating 318 the database of aisle locations, the database may be updated to include a primary or additional aisle location if an aisle location is already present in the database. In another embodiment, updating 318 the database may include removing a stored aisle location from the database if the store aisle location is very infrequently found in the pathways and purchased items. For example, if a retail product is picked up from a location where it is not typically shelved (such as when a customer removes an item from their cart but does not re-shelve the item from where it was initially retrieved), the database may have been updated with inaccurate information and these inaccurate aisle locations may be removed from the database based on the frequency of the aisle or retrieval locations received at the point of sale terminals.

In step 320, the process 300 may further include notifying an associate of one or more aisle locations for a particular retail item. This may be facilitated via an associate electronic device 104 that may permit an associate to query one or more databases 110 of retail items. The associate electronic devices 104 also may permit a store associate to manually input an aisle location for a retail item or a retail item disposed within the retail facility. For example, if a store associate sets up a seasonal display that includes outdoor holiday lights and extension cords, the store associate may update the database 110 to indicate that the holiday lights and extension cords are now found in the seasonal display.

In one exemplary approach, the method 300 further includes extracting 322 a specific retrieval location of at least one of the purchased items by analyzing the associated purchased retail items and pathways or floor compounds identified. Furthermore, the method 300 also may include determining 324 a low shelf supply based on that information. For example, a low shelf supply may be determined based on the repeated extraction of the same retrieval location for a particular item. In this manner, if an identical retrieval location for a particular retail item is obtained or extracted a predetermined number of times, the central computer 106 may notify a store associate about the issue such that it can be addressed by restocking the retail item.

Figure 4:
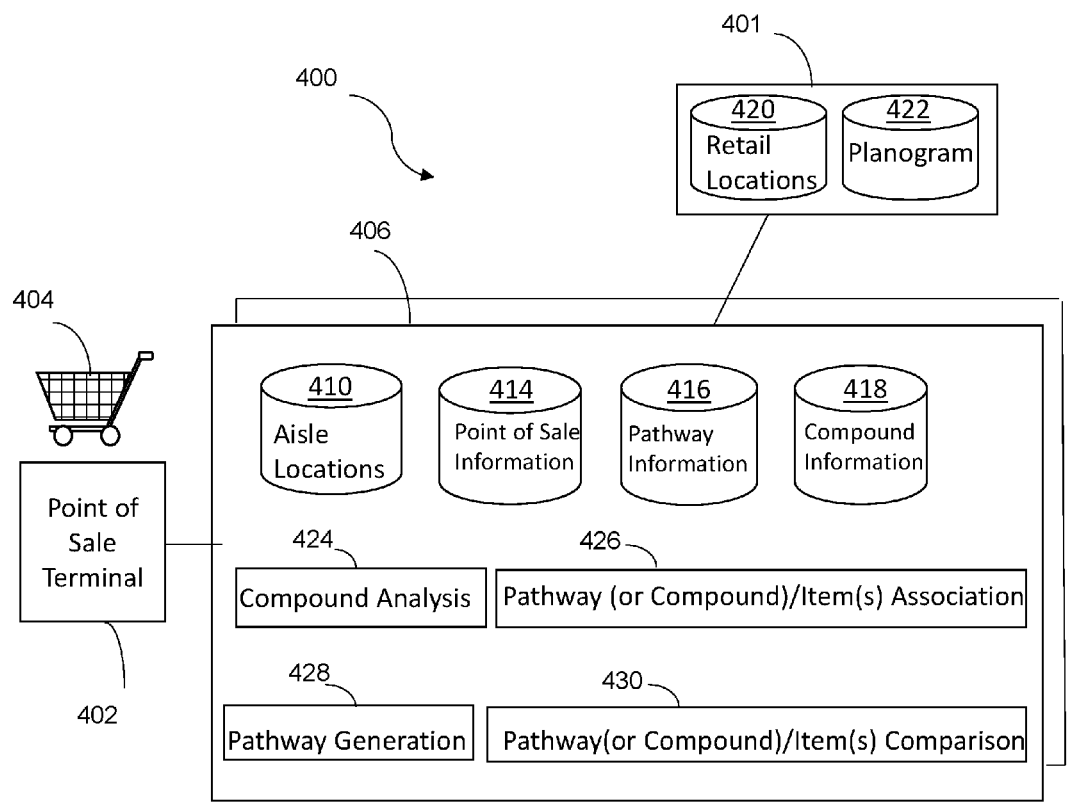
FIG. 4 illustrates an exemplary item location system in accordance with several embodiments.

FIG. 4 illustrates one exemplary shopping or item location system 400 with an item location server 406 (that may analyze and store information about retail products within the retail facility) and is in communication with a point of sale terminal 402. As suggested above, store information about locations of retail products located in a store's item location server 406 may be communicated to a central planner or headquarters 401, which also may be in communication with other similar such store servers 406 from other retail locations. By one approach, the headquarters 401 that coordinates with several retail facilities may have a database 420 of aisle locations within different retail locations and also a planogram 422 of where the headquarters 401 intends the retail items to be shelved in the various retail facilities. In this manner, the headquarters 401 can analyze the actual shelf location of retail items found in the database 420 and compare it with the planogram 422 to determine how accurately the associates at a given store or retail facility are organizing the facility.

As illustrated in FIG. 4, the item location server 406 may include a database of aisle locations 410, a database of information received from the point of sale terminals 414, a database of pathway information 416, and a database of floor compound information 418. Though item location server 406 is illustrated as having these databases within the item location server 406, these databases also may be stored outside of the server 406 and merely in communication with server 406.

In addition to a variety of databases, the item location server 406 also may provide compound analysis 424 (such as analysis of the compounds on the cart wheels), pathway or floor compound and purchased retail item association 426, pathway determination 428, and/or comparison of different customer's associated pathways (or floor compounds) and purchased retail items 430. Though item location server 406 is illustrated as providing these capabilities these also may be provided by other servers or devices in communication with the item location server 406.

Figure 5:
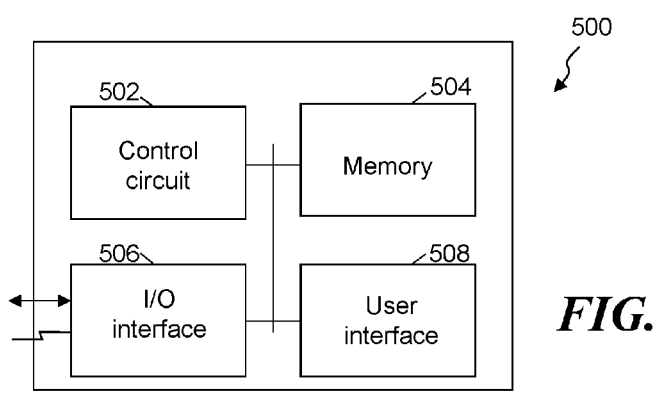
FIG. 5 illustrates an exemplary system for use in implementing systems, apparatuses, devices, methods, techniques and the like in tracking carts and products in a shopping space in accordance with some embodiments.

The methods, techniques, systems, devices, services, servers, sources and the like described herein may be utilized, implemented and/or run on many different types of devices and/or systems. Referring to FIG. 5, there is illustrated a system 500 that may be used for any such implementations, in accordance with some embodiments. One or more components of the system 500 may be used to implement any system, apparatus or device mentioned above or below, or parts of such systems, apparatuses or devices, such as for example any of the above or below mentioned item location system 100, central computer system 106, point of sale terminal(s) 102, associate electronic device(s) 104, cart path evaluation circuit 112, database 110, item location system 400, parts thereof, and the like. However, the use of the system 500 or any portion thereof is certainly not required.

By way of example, the system 500 may include one or more control circuits 502, memory 504, and input/output (I/O) interfaces and/or devices 506. Some embodiments further include one or more user interfaces 508. The control circuit 502 typically comprises one or more processors and/or microprocessors. The memory 504 stores the operational code or set of instructions that is executed by the control circuit 502 and/or processor to implement the functionality of the item location system 100, central computer system or control circuit 106, point of sale terminal(s) 102, associate electronic device(s) 104, cart path evaluation circuit 112, database 110, the compound detector(s) 116, the image capturing device(s) 120, the illuminating light device(s) 119, the item location system 400, parts thereof, and the like. In some embodiments, the memory 504 may also store some or all of particular data that may be needed to maintain a database of aisle locations associated with retail items located within a retail facility, associate the different floor compounds with the different areas or aisles within the retail facility, capture the floor compounds deposited on the cart wheels, generate an estimated cart path, receive a list of purchased retail items from the point of sale terminal and associate the list of purchased retail items with pathways or floor compounds, identify a particular aisle location of one of the purchased retail items by comparing the associated list of purchased retail items and pathways or floor compounds with similar information from other customers, and/or update the database accordingly.

It is understood that the control circuit 502 and/or processor may be implemented as one or more processor devices as are well known in the art. Similarly, the memory 504 may be implemented as one or more memory devices as are well known in the art, such as one or more processor readable and/or computer readable media and can include volatile and/or nonvolatile media, such as RAM, ROM, EEPROM, flash memory and/or other memory technology. Further, the memory 504 is shown as internal to the system 500; however, the memory 504 can be internal, external or a combination of internal and external memory. Additionally, the system typically includes a power supply (not shown), which may be rechargeable, and/or it may receive power from an external source. While FIG. 5 illustrates the various components being coupled together via a bus, it is understood that the various components may actually be coupled to the control circuit 502 and/or one or more other components directly.

Generally, the control circuit 502 and/or electronic components of the system 500 can comprise fixed-purpose hard-wired platforms or can comprise a partially or wholly programmable platform. These architectural options are well known and understood in the art and require no further description here. The system and/or control circuit 502 can be configured (for example, by using corresponding programming as will be well understood by those skilled in the art) to carry out one or more of the steps, actions, and/or functions described herein. In some implementations, the control circuit 502 and the memory 504 may be integrated together, such as in a microcontroller, application specification integrated circuit, field programmable gate array or other such device, or may be separate devices coupled together.

The I/O interface 506 allows wired and/or wireless communication coupling of the system 500 to external components and/or or systems. Typically, the I/O interface 506 provides wired and/or wireless communication (e.g., Wi-Fi, Bluetooth, cellular, RF, and/or other such wireless communication), and may include any known wired and/or wireless interfacing device, circuit and/or connecting device, such as but not limited to one or more transmitter, receiver, transceiver, etc.

The user interface 508 may be used for user input and/or output display. For example, the user interface 508 may include any known input devices, such one or more buttons, knobs, selectors, switches, keys, touch input surfaces, audio input, and/or displays, etc. Additionally, the user interface 508 include one or more output display devices, such as lights, visual indicators, display screens, etc. to convey information to a user, such as but not limited to customer information, shopping lists, available items, requested items, product orders, product information, communication information (e.g., text messages, emails, etc.), status information, notifications, errors, conditions, and/or other such information. Similarly, the user interface 508 in some embodiments may include audio systems that can receive audio commands or requests verbally issued by a user, and/or output audio content, alerts and the like.

As noted above, these teachings also may be configured to monitor the safety and security of large facilities, such as public transit facilities, military installations, and nuclear facilities, among many others. To that end, the compound detectors may be placed near access points within and around such facilities and not just at point of sale terminals. In addition to having compound detectors at access points, the facilities may have compound detectors throughout the facility, and these distributed compound detectors may detect or track movement of the various compounds through the facility. When analyzing the compounds intentionally disposed upon the floor or ground to assist with monitoring movement of individuals, the system also may scan for additional compounds, such as explosive compounds or compounds known to be used in the making of explosives.

By one approach, a system for monitoring large facilities may track known individuals within the facilities (e.g., those with identities known to the system) who are identified upon entrance to the facility and have a clearance or access level associated therewith. In one configuration, upon entering or exiting through an access point, the known individuals and their associated clearance level or access permissions are compared to the compounds detected on them at the access point.

As used herein, a monitored facility or installation may include, for example, a building, a public structure (such as, for example, a tunnel or bridge), or the grounds or land within a secure compound and the buildings and structures therein, among others. In one illustrative example, if a secure compound grants access to a particular delivery vehicle to pick up packages at a low-clearance location within the secure compound, the wheels or tires of the vehicle will be scanned by a compound detector as the vehicle approaches or passes through an access point to confirm that the vehicle did not contact a compound indicating that the vehicle entered a restricted area requiring a higher clearance level. If the compound detector scans the delivery vehicle and detects a compound associated with a higher clearance level area, the vehicle and its occupants will be stopped for further inspection or investigation.

As used herein, an access point is a location within the facility where unregulated free flow of traffic is not permitted. In operation, the access point may include a security screening area (e.g., a security checkpoint or desk) and a locked or monitored entryway that requires confirmation of identify or the input of a passcode to permit access thereto, among others.

In one illustrative approach, a facility monitoring system includes a database of individuals or items permitted within a facility and approved, expected, or permitted locations for each of the individuals or items in the database, a plurality of compounds disposed in different areas of a floor of the facility (the floor compounds including at least a first compound with a first light spectra and a second compound having a second light spectra, the first and second light spectra absorbing or emitting different spectra of light), an access point at the facility with a sensor configured to identify individuals or items exiting the facility, a compound detector configured to detect compounds present on or associated with the individuals or items exiting the facility at the access point, and a control circuit coupled to the database, the sensor, and the compound detector. By one approach, the control circuit is configured to identify visited or accessed areas within the retail facility by analyzing the detected compounds present on or associated with the individuals or items passing through the access point. Further, in some configurations, the control circuit is configured to compare the visited areas in the facility with the database of individuals or items to determine whether the visited areas only include approved, expected or permitted locations in the database. With this information, in some configurations, the control circuit flags the particular individual or the particular item for consideration by security staff if the visited area associated therewith is not one of the approved expected or access locations in the database.

The database of individuals or items permitted within a facility and approved, expected, or permitted locations associated therewith may include for example, a list of employees who have permission to enter a building and the areas within the building that those employees are permitted to access. In addition, the database may have a list of items that the individual may bring with them such as, for example, bags, carts, or other objects.

Figure 6:
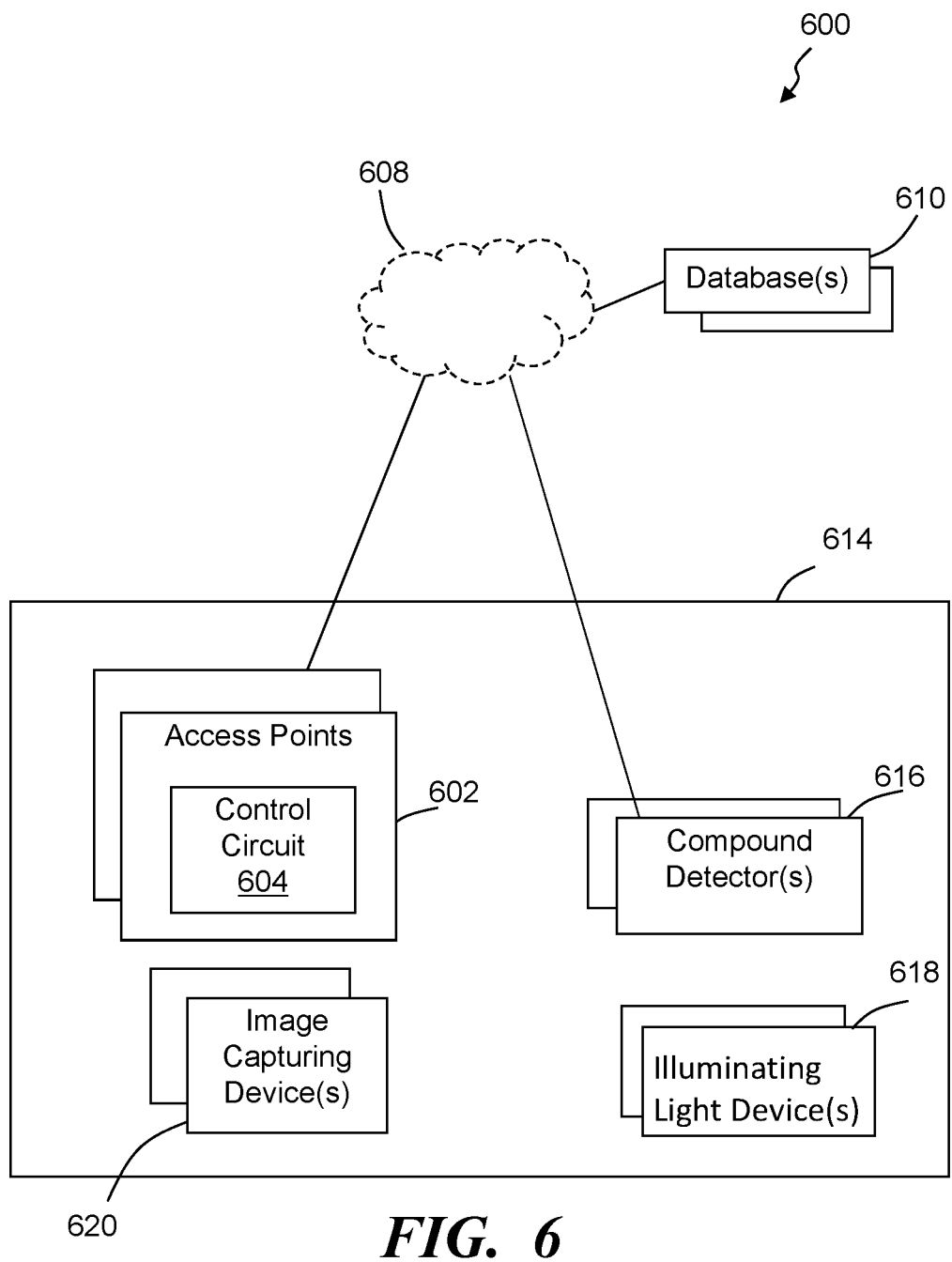
FIG. 6 is a simplified block diagram of another exemplary facility monitoring system in accordance with some embodiments.

FIG. 6 illustrates a simplified block diagram of an exemplary facility monitoring system 600, according to some embodiments, which facilitates monitoring the safety, security, and/or status of the individuals and items within the facility 614. The facility monitoring system 600 includes a database 610 of individuals or items permitted within the facility 614 and the approved, expected, or permitted access locations for those individuals or items. The database(s) 610 also may associate the plurality of compounds with the different areas of the retail floor upon which the compound is disposed. For example, the database 610 may associate a first floor compound with a first area of the facility and a second floor compound with a second area of the facility. The database 610 may be queried or referenced by the access points 602 or the control circuit 604 associated therewith to confirm whether an individual passing through an access point 602 has accessed any areas or locations to which that individual does not have permission.

To that end, the access points 602 may have a compound detector 616 associated therewith that is configured to detect the compounds applied to the floor that have been contacted by or found on the individual, especially portions thereof that typically contact the ground such the soles of their feet or footwear. The compound detector 616, may be similar to compound detector 116 discussed above. Accordingly, the compound detector 616 may have an illuminating light device 618 associated therewith that may shine a light at a specific light frequency to help illuminate the compounds. The system 600 also may include one or more image capturing devices 620. By one approach, the image capturing device 620 is disposed proximate the compound detector 616 and is configured to capture images of the portions of the individual likely to contact the compounds on the floor. Similar to embodiments discussed above, the components of the system 600 may communicate via a network 608.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A facility monitoring system comprising:
   a database of individuals or items permitted within a facility and one or more approved, expected, or permitted locations for each of the individuals or items in the database;
   a plurality of compounds disposed in different areas of a floor of the facility, the floor compounds including at least a first compound with a first light spectra and a second compound having a second light spectra, the first and second light spectra absorbing or emitting different spectra of light;
   at least one access point at the facility with a sensor configured to identify a particular individual or particular item exiting the facility;
   a compound detector configured to detect compounds present on or associated with the individuals or items exiting the facility at the access point; and
   a control circuit coupled to the database, the sensor, and the compound detector, the control circuit configured to identify visited areas where the particular individual or the particular item accessed in the facility by analyzing the detected compounds present on or associated with the individuals or items.

2. The facility monitoring system of claim 1 wherein the control circuit is configured to compare the visited areas in the facility with the database of individuals or items to determine whether the visited areas only include associated, expected locations in the database.

3. The facility monitoring system of claim 2 wherein the control circuit is further configured to flag the particular individual or the particular item for consideration by security staff if the visited area associated therewith is not one of the associated, expected locations in the database.

4. A facility monitoring system comprising:
   a database of a plurality of retail items disposed within a retail location and an aisle location associated with some of the plurality retail items;
   a floor surface of the retail location, the floor surface having a plurality of compounds deposited thereon, the plurality of compounds including at least a first compound having a first light spectra and a second compound having a second light spectra, the first and second light spectra absorbing or emitting different spectra of light;
   a plurality of shopping carts, each of the plurality of shopping carts having cart wheels configured to pick up the compounds deposited on the floor surface when at least one of the cart wheels contacts the floor surface upon which the compound is deposited;
   at least one point of sale terminal in the retail location;
   a compound detector configured to detect the compounds present on the cart wheels; and
   a control circuit coupled to the database, the at least one point of sale terminal in the retail location, and the compound detector, the control circuit configured to generate an estimated cart path for a particular one of the plurality of shopping carts by analyzing the detected compounds present on the cart wheels of the particular shopping cart.

5. The system of claim 4 wherein the control circuit is further configured to:
   receive a list of purchased items from the point of sale terminal and associate the estimated cart path for the particular shopping cart with the list of purchased items from the particular shopping cart;
   compare the associated estimated cart path and list of purchased items from the particular shopping cart with other customer cart paths and purchased items associated therewith;
   identify, based at least on the estimated cart path and point of sale data for a list of purchased items, a particular aisle location of one of the plurality of retail items; and
   update the database of the plurality of retail items to include the particular aisle location identified for the one of the plurality of retail items.

6. The system of claim 4 wherein the compound detector is disposed proximate the point of sale terminal.

7. The system of claim 4 further comprising an illuminating light disposed proximate the compound detector, the illuminating light configured to shine a specific light frequency at the cart wheels as the compound detector detects the compounds present on the cart wheels.

8. The system of claim 7 further comprising an image capturing device configured to take an image of the cart wheels proximate the point of sale terminal.

9. The shopping system of claim 5 wherein the control circuit is further configured to analyze the estimated cart path for the particular shopping cart, the list of purchased items for the particular shopping cart and the database and determine a retrieval location for at least one of the purchased items.

10. The shopping system of claim 9 wherein the control circuit is further configured to determine a low shelf supply based upon receipt of a predetermined number of identical retrieval locations and send the associate electronic device a notification of low shelf supply.

11. The system of claim 4 wherein the compound detector is a spectrometer.

12. The system of claim 4 further comprising multiple compound detectors disposed throughout retail location.

13. The system of claim 4 wherein each of the plurality of compounds is configured to emit or absorb a specific light wave or a combination of specific light waves and are configured to be accumulated by the cart wheels as the shopping carts are advanced through the retail location.

14. The system of claim 4 wherein the plurality of wheels have an affinity for the compounds deposited on the floor surface and the compound detector is further configured to measure the amount of each of the plurality of compounds present on the cart wheels at the point of sale terminal.

15. The system of claim 4 wherein the database includes a plurality of aisle locations for some of the retail items and the control circuit is further configured to update the database to include the particular aisle location identified as an additional aisle location or a primary aisle location if no other aisle location is stored within the database.

16. The system of claim 4 further comprising an associate electronic device in communication with the control circuit and database, the associate electronic device configured to display available aisle location of the retail items.

17. The system of claim 16 wherein the associate electronic device is further configured to update the database including at least one of: adding a retail item into the database, adding an aisle location of one of the plurality of retails items, and updating at least one of the retail items or the aisle location associated therewith.

18. The system of claim 4 further comprising a wheel cleaning area disposed in between the point of sale terminal and an exit of the retail location, the wheel cleaning area configured to remove substantially all of the compounds disposed on the cart wheels.

19. A method of locating and monitoring items within a retail location, the method comprising:
    maintaining a database of aisle locations associated with retail items located within the retail location;
    depositing a plurality of compounds onto a floor surface of the retail location, the plurality of compounds including a first compound having a first light spectra and a second compound having a second light spectra, the first and second light spectra absorbing or emitting different spectra of light;
    providing shopping carts with wheels configured to pick up the compounds deposited on the floor of the retail location;
    capturing, via a compound detector, the compounds deposited on the cart wheels of a particular shopping cart during a customer checkout at a point of sale terminal; and
    generating an estimated cart path for the particular one of the plurality of shopping carts.

20. The method of claim 19 further comprising:
    receiving, from the point of sale terminal, a list of purchased items from the particular shopping cart and associating the list of purchased items with the estimated cart path for the particular shopping cart;
    identifying a particular aisle location of one of the purchased retail items by comparing the associated list of purchased retail items and cart path for the particular shopping cart with other customer cart paths and the purchased items associated therewith; and
    updating the database according to the particular aisle location of the purchased retail item identified by comparing the associated list of purchased retail items and cart path with other customer cart paths and purchases items associated therewith.

21. The method of claim 20 wherein updating the database comprises adding the particular aisle location as an additional aisle location or a primary aisle location if no other aisle location information is stored within the database and the method further comprises notifying an associate of available aisle location information for one of the retail items.

22. The method of claim 20 further comprising extracting a retrieval location of at least one of the purchased items by analyzing the associated list of purchased retail items from the particular shopping cart, the cart path for the particular shopping cart, and the database.

23. The method of claim 22 further comprising determining a low shelf supply based on the extraction of identical retrieval locations a predetermined number of times in a predetermined amount of time.

* * * * *